United States Patent
Pham et al.

(10) Patent No.: US 8,590,150 B2
(45) Date of Patent: Nov. 26, 2013

(54) IMPELLER MANUFACTURING METHOD

(75) Inventors: Khanhson Pham, Tokyo (JP); Hiroshi Nakajima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/805,021

(22) PCT Filed: Oct. 25, 2011

(86) PCT No.: PCT/JP2011/005953
§ 371 (c)(1),
(2), (4) Date: Dec. 28, 2012

(87) PCT Pub. No.: WO2012/095908
PCT Pub. Date: Jul. 19, 2012

(65) Prior Publication Data
US 2013/0140349 A1    Jun. 6, 2013

(30) Foreign Application Priority Data
Jan. 14, 2011  (JP) .................. 2011-005402

(51) Int. Cl.
*B21D 51/16* (2006.01)
(52) U.S. Cl.
USPC .............. 29/889; 29/525.14; 228/101
(58) Field of Classification Search
USPC ............. 29/889, 525.14; 228/101, 214, 222
See application file for complete search history.

(56) References Cited

U.S. PATENT DOCUMENTS 6,079,613 A * 6/2000 Sisskind et al. ............... 228/222
7,247,000 B2 * 7/2007 Cahoon et al. ............ 416/146 R
7,425,118 B2 * 9/2008 Beeson et al. ............ 416/146 R

FOREIGN PATENT DOCUMENTS

| JP | 54-28006 | 3/1979 |
| JP | 64-48682 | 2/1989 |
| JP | 2000-050586 | 2/2000 |
| JP | 2004-36485 | 2/2004 |
| JP | 2008-279461 | 11/2008 |
| JP | 2010-229894 | 10/2010 |

OTHER PUBLICATIONS

International Search Report issued Jan. 17, 2012 in International (PCT) Application No. PCT/JP2011/005953.
International Preliminary Report on Patentability and Written Opinion of the International Searching Authority mailed Jul. 25, 2013 in International (PCT) Application No. PCT/JP2011/005953.

* cited by examiner

*Primary Examiner* — David Bryant
*Assistant Examiner* — Ruth G Hidalgo-Hernandez
(74) *Attorney, Agent, or Firm* — Wenderoth, Lind & Ponack, L.L.P.

(57) ABSTRACT

The present invention relates to a method of joining a hub 11 and a shroud 12 of an impeller 10, either one of which has blades 13 integrally formed thereon, by welding. During the welding, in an upright state in which the hub 11 is placed to face a mount surface, the hub 11 and the shroud 12 are placed on top of each other to form an assembled body 10. Welding is performed on the assembled body 10 covered with a heat insulating jacket 30(*a* to *g*), the jacket 30 covering the assembled body 10 except an open region (OP) and an inflow port $14_{IN}$ required for welding. When welding of one open region OP is completed, a new open region OP is formed by moving the heat insulating jacket 30 with respect to the assembled body, and then the next welding is performed.

9 Claims, 6 Drawing Sheets

IMPELLER MANUFACTURING METHOD

TECHNICAL FIELD

The present invention relates to a method of manufacturing an impeller (a rotary wing) for use in a centrifugal compressor or other rotating machines and, in more detail, to a method of joining a plurality of components configuring an impeller by welding.

BACKGROUND ART

Figure 5:
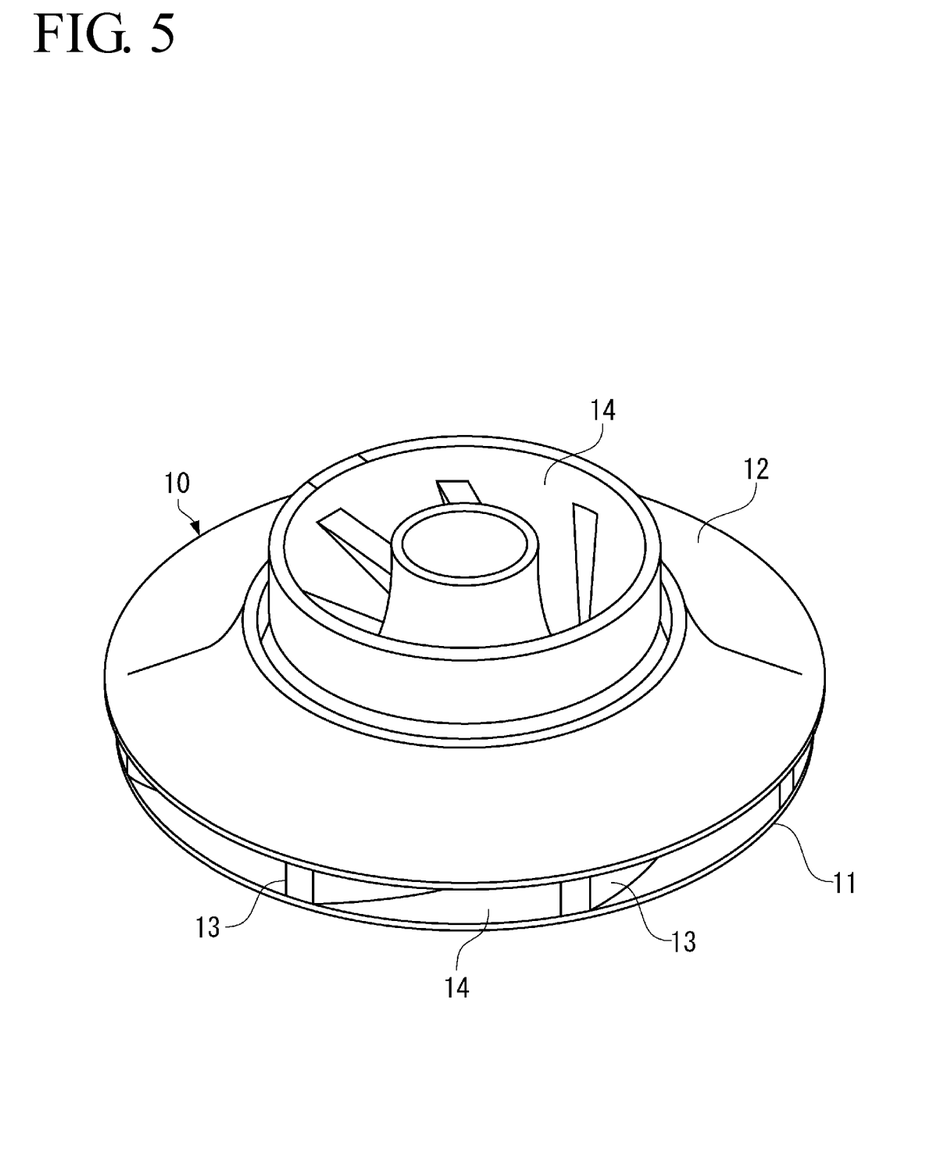
FIG. 5 is a perspective view of the impeller.

For example, as shown in FIG. 5, an impeller 10 for an centrifugal compressor is configured of a hub 11 with one surface fixed to a rotation main axis of the centrifugal compressor for rotation being curved to be thinner toward its tip, a shroud 12 in the shape of facing the curved surface of the hub 11, and a plurality of blades 13 provided so as to partition a curved surface between the hub 11 and the shroud 12 in a swirl shape. Among the hub 11, the shroud 12, and the blades 13, a flow path 14 for compressed gas is formed.

Examples of the impeller 10 include one called a three-piece type in which the hub 11, the shroud 12, and the blades 13 are individually produced and joined to one another and one called a two-piece type in which the shroud 12 and the blades 13 (or the hub 11 and the blades 13) are integrally fabricated and are joined to the hub (or the shroud 12) fabricated separately therefrom. In the impeller 10 of any of these three-piece type and two-piece type, joining is made by welding or brazing. Whether joining is made by welding or brazing is determined based on the size, strength, and others of the impeller 10.

CITATION LIST

Patent Document

Patent Document 1: Japanese Patent Laid-Open No. 2008-279461

SUMMARY OF THE INVENTION

Technical Problems to be Solved by the Invention

When components are joined by welding to make the impeller 10, the following problems have been pointed out.

During welding, in order to prevent cold cracking due to hydrogen embrittlement of each component (impeller material), the impeller material is required to be kept at a predetermined temperature or higher. For this purpose, preheating is performed to heat the impeller before welding starts. However, even if the temperature is increased by preheating, the temperature may be decreased during welding to cause cold cracking.

When welding is performed to make an impeller, a positioner capable of changing the orientation of the impeller is used to facilitate a welding torch to access a required position. Welding is performed with the impeller mounted on this positioner. Thus, by performing a welding operation with the impeller material mounted on a positioner having a heating function, the temperature of the impeller material during welding is kept.

However, even in this method of using the positioner with the heating function, a portion of the surface of the impeller material may be directly in contact with the atmosphere during welding, and therefore a local temperature decrease occurs. Thus, it is not easy to uniformly keep the temperature of the entire impeller.

Moreover, to withstand radiant heat from the impeller material with its temperature kept after preheating, the worker is required to wear a heavy heat insulation equipment, thereby degrading workability. To reduce work load on the worker, for example, as described in Patent Document 1, welding can be performed by a robot. However, if the trail of a weld line is complex or a portion where the welding torch is inserted is narrow, welding by a robot is difficult, and it is required to depend on manual work.

The present invention is made based on the problems described above, and has an object of providing an impeller welding method capable of avoiding a decrease in temperature when a worker joins by welding to make an impeller and also reducing work load.

Solution to the Problems

An impeller to which the invention is directed includes a hub, a shroud placed to face the hub, and a plurality of blades provided between the hub and the shroud. In this impeller, a flow path leading from an inflow port to a discharge port is provided between the hub and the shroud. A fluid flows from the inflow port toward the discharge port. In this impeller, the hub and the shroud are joined by welding.

In the present invention, during this welding, an assembled body with the hub and the shroud placed on top of each other is in an upright state in which the inflow port is oriented upward and the hub is placed to face a mount surface. And, in the present invention, welding is performed with the assembled body except an open region and the inflow port that are required for welding being covered with a heat insulating jacket.

In the present invention, when welding of one open region is completed, the heat insulating jacket is moved with respect to the assembled body to form a new open region for next welding.

In the impeller welding method of the present invention, the heat insulating jacket may be integrally formed (hereinafter, an integral jacket), but is preferably formed of a plurality of divisional segment jackets.

It is not easy to move the integral jacket, which has large area and heavy weight, after welding of one open region is completed. In comparison, with the plurality of divisional segment jackets, moving only one divisional segment jacket is enough to form a new open region, and therefore the task is easy.

In the impeller welding method of the present invention, there are several modes of forming an open region. For example, when the heat insulating jacket is configured of a plurality of segment jackets, the open region can be formed by not placing a segment jacket on a position where an open region is to be formed. The open region can also be formed by providing a window penetrating through both of front and rear surfaces to both of the integral jacket and the segment jackets at a position that is supposed to correspond to the open region. In this mode of forming a window, positions where an open region is to be formed can be narrowed to a specific region required for welding. This is advantageous for preventing a decrease in temperature during welding.

In the impeller welding method of the present invention, it is effective to use a positioner in order to reduce the work load of moving the heat insulating jacket after welding for one open region is completed. The positioner for this purpose is configured of a positioner body and a mount table rotatably placed relative to the positioner body. While the assembled body is mounted on the mount table, the assembled body is covered with the heat insulating jacket fixed to the positioner body. When the mount table is rotated after welding for one open region is completed, the assembled body rotates (moves) according to the rotation of the mount table. However, since the heat insulating jacket is fixed to the positioner body, the assembled body and the heat insulating jacket relatively move. As a result, a new open region can be formed while manual work is minimized.

Although any method can be used as a method of fixing the heat insulating jacket to the positioner body, it is preferable to use a fastener such as a bolt that allows easy attachment and removal of the heat insulating jacket.

In the mode of using the positioner described above, when the heat insulating jacket covering the assembled body is the segment jackets, adjacent ones of the segment jackets are preferably connected with a connecting member. This is to avoid the segment jackets from curling up in accordance with the rotation of the mount table and becoming unable to cover a necessary position of the assembled body. Any connecting member can be used, such as a wire.

Advantageous Effects of Invention

According to the present invention, since a worker makes an impeller by welding while covering the assembled body with the heat insulating jacket, a decrease in temperature of the assembled body can be avoided. Also, since the worker is not required to wear a heavy heat insulation equipment, work load on the worker can be reduced.

DESCRIPTION OF EMBODIMENT

With reference to FIG. 1 to FIG. 4, the present invention is described below based on an embodiment.

Figure 1:
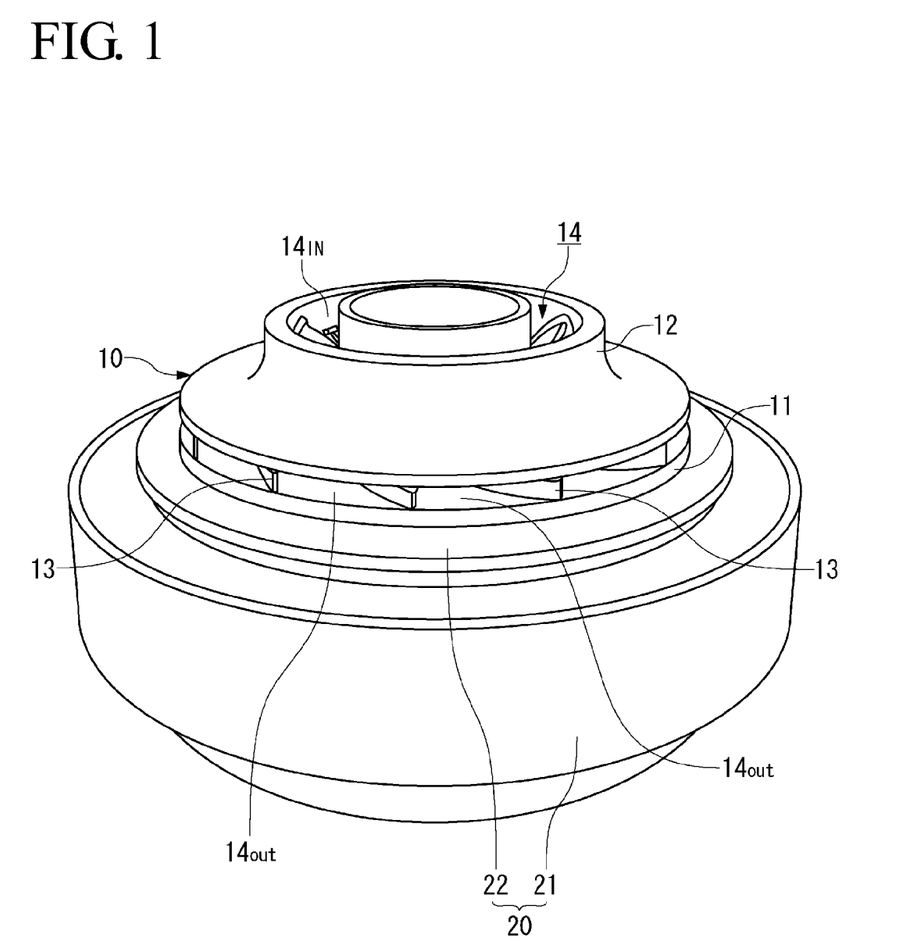
FIG. 1 is a perspective view of an impeller mounted on a positioner.

In the present embodiment, as shown in FIG. 1, welding is performed with an impeller 10 mounted on a positioner 20.
<Impeller 10>

As described above by using FIG. 5, the impeller 10 includes a hub 11, a shroud 12 placed to face the hub 11, and a plurality of blades 13 provided between the hub 11 and the shroud 12. In the impeller 10, a flow path 14 leading from an inflow port $14_{IN}$ to a discharge port $14_{OUT}$ is provided between the hub 11 and the shroud 12. For example, in a centrifugal compressor, a fluid to be compressed flows in from the inflow port $14_{IN}$, and is discharged from the discharge port $14_{OUT}$.

The blades 13 are formed integrally with the hub 11 or the shroud 12. When the blades 13 are formed integrally with the hub 11, the blades 13 and the shroud 12 are joined by welding. When the blades 13 are formed integrally with the shroud 12, the blades 13 and the hub 11 are joined by welding. During welding, the hub 11 and the shroud 12 are placed on top of each other in an upright state in which the hub 11 faces a mount table 22 (a mount surface) of the positioner 20 to form the impeller 10. In the upright state, the impeller 10 has the inflow port $14_{IN}$ oriented upward. Note that since the impeller 10 is a precursor until welding ends to complete the impeller 10, this precursor is hereinafter referred to as an assembled body and is provided with the same reference numeral as that of the impeller 10. Also, preliminary welding may be performed to prevent a positional misalignment between the hub 11 and the shroud 12 when the assembled body is configured.
<Positioner 20>

With the positioner 20 where the assembled body 10 for welding is mounted, the posture of the assembled body 10 can be changed during welding.

The positioner 20 includes a positioner body 21 and a mount table 22. The positioner body 21 is set to be able to swing in a three-dimensional direction by a mechanism not shown in the drawings. The worker adjusts the posture of the positioner body 21 so as to facilitate the welding operation.

The mount table 22 is rotatably held with respect to the positioner body 21. Therefore, the assembled body 10 can be rotated via the mount table 22 independently of the positioner body 21.

To avoid a decrease in temperature of the assembled body 10 during welding, the positioner 20 includes heating means (not shown) such as a heater in the positioner body 21 or the mount table 22.
<Arrangement of Segment Jackets 30a to 30g>

Figure 2A:
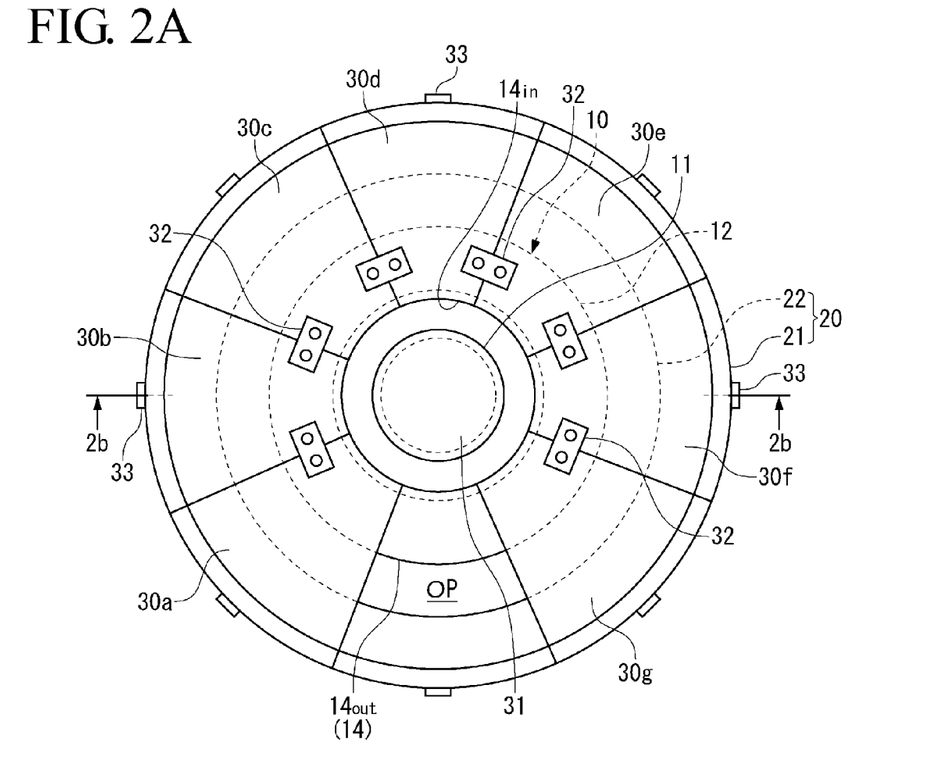
FIGS. 2A and 2B show the impeller covered with a heat insulating jacket in the present embodiment, FIG. 2A being a plane view and FIG. 2B being a 2b-2b arrow sectional view of FIG. 2A.
Figure 2B:
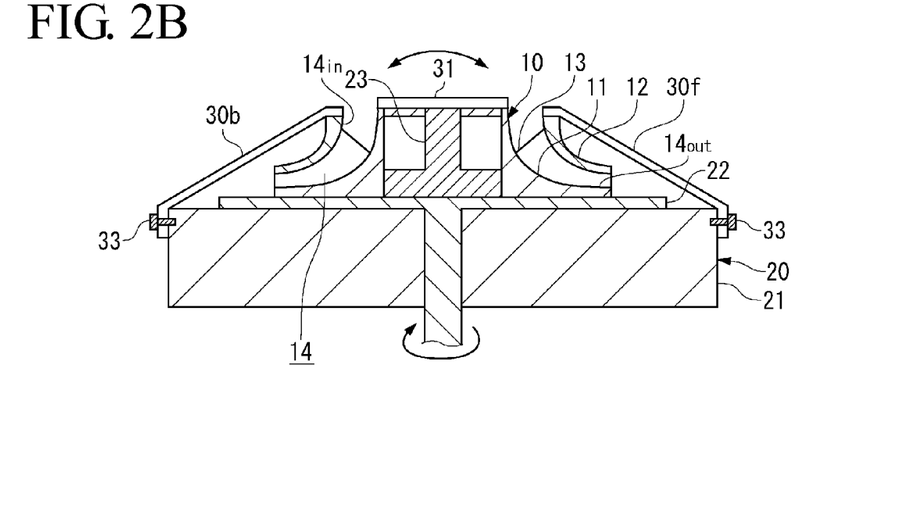
Figures 3A, 3B:
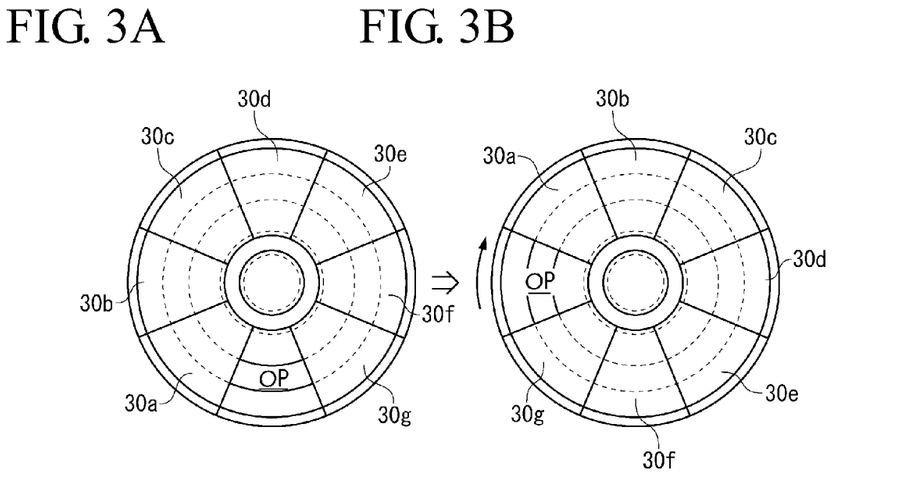
FIGS. 3A to 3D are a diagram showing the state in the present embodiment in which the heat insulating jacket moves in a circumferential direction with respect to the impeller.
Figures 3C, 3D:
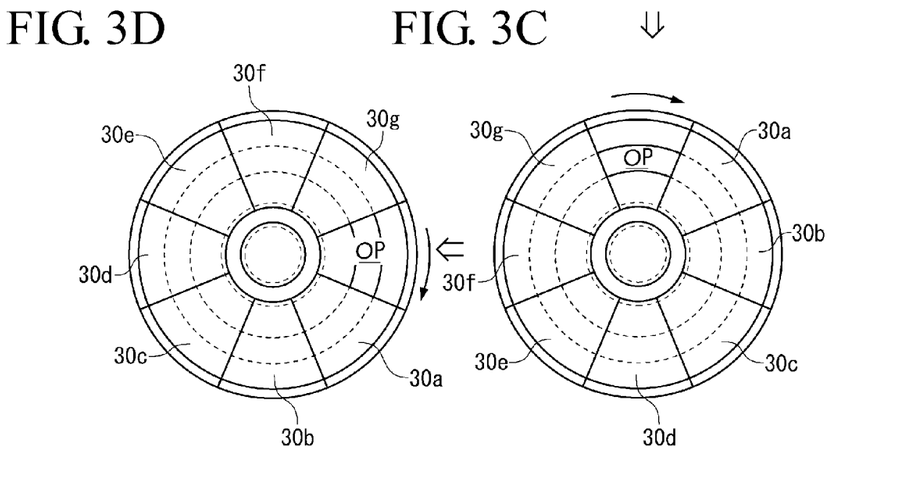

In the present embodiment, welding is performed with the assembled body 10 being covered with a heat insulating jacket. Description is made below with reference to FIG. 2.

Since the assembled body 10 has a ring shape in a planar view, if the heat insulating jacket is integrally fabricated, the heat insulating jacket has a ring shape. In the present embodiment, however, a plurality of segment jackets (heat insulating jackets) 30a to 30g obtained by dividing the ring shape in a circumferential direction into plural portions are used. Since the ring shape is divided into eight in the present embodiment, the segment jackets 30a to 30g each have a fan shape with a central angle of 22.5 degrees. The number of division, eight, is merely an example and, needless to say, another number of division can be adopted. The present invention also includes a mode in which the heat insulating jacket is integrally formed.
<Open Region OP>

In the present embodiment, the segment jackets 30a to 30g are spread in a circumferential direction over the assembled body 10 without a gap to cover the assembled body 10 with the segment jackets 30a to 30g.

Since the segment jackets 30a to 30g each have a central angle of 22.5 degrees, a region corresponding to one segment jacket cannot be covered with a segment jacket. Welding is performed correspondingly to an open region OP not covered with this heat insulating jacket (the segment jackets 30a to 30g). From the open region OP, the discharge port $14_{OUT}$ (the flow path 14) of the assembled body 10 is exposed, where a welding torch (not shown) is inserted to be able to weld the blades 13 and the hub 11 (or the shroud 12). The open region OP defines a range capable of successive welding at a time.

<Open of Inflow Port $14_{IN}$>

In the present embodiment, an inner diameter side of the hub 11 of the assembled body 10 is also covered with a circular heat insulating jacket 31. The heat insulating jacket 31 is supported by a support 23. However, the inflow port $14_{IN}$ is open without being covered with a heat insulating jacket. That is, in a planar view, except the open region OP and the inflow port $14_{IN}$, the assembled body 10 is covered with the heat insulating jacket (the segment jackets 30a to 30g) and the heat insulating jacket 31.

The reason for excluding the inflow port $14_{IN}$ from targets for covering with a heat insulating jacket is as follows. Welding is performed with the welding torch inserted from the discharge port $14_{OUT}$. For appropriate welding, a brightness with which a position to be welded is viewable is required. Thus, to ensure the brightness required for the position to be welded by letting light in from the inflow port $14_{IN}$, the inflow port $14_{IN}$ is not covered with a heat insulating jacket. Also, while most of the welding of the blades 13 and the hub 11 (or the shroud 12) can be performed by inserting the welding torch from the discharge port $14_{OUT}$, it may be sometimes appropriate to insert the welding torch from the inflow port $14_{IN}$. In consideration of such case, the inflow port $14_{IN}$ is open.

<Fixed State of Segment Jackets 30a to 30g>

While the segment jackets 30a to 30g are fixed to an outer perimeter of the positioner body 21 with fasteners 33 such as bolts, portions covering the assembled body 10 are not fixed to the assembled body 10. That is, the segment jackets 30a to 30g each have a lower end fixed but other portions simply placed on the assembled body 10. The bolts as fixing means to the positioner body 21 are merely an example, and another fixing means can be used. For example, cramping members can be provided to the positioner body 21 to cramp the segment jackets 30a to 30g.

Also, adjacent ones of the segment jackets 30a to 30g are connected to each other with a connector 32, thereby increasing stiffness as a whole. Any mode of the connector 32 can be used, and any of various modes can be applied, such as a mode in which a hook is provided to one side and an engaging hole for this hook is provided to the other side.

<Movement of Open Region>

When welding for one open region OP is completed, the worker goes away from the assembled body 10 mounted on the positioner 20 and rotates the mount table 22 of the positioner 20. The mount table 22 is rotated by an angle corresponding to the central angle (22.5 degrees) of one segment jacket 30a (to 30g), which state is shown in FIGS. 3A to 3D. However, to clarify that the open region OP moves, the segment jackets 30a to 30g are moved in FIGS. 3A to 3D. FIG. 3A to FIG. 3D each show the state in which the segment jackets 30a to 30g go round, and the segment jackets 30a to 30g make a rotational movement twice each between FIG. 3A and FIG. 3B, FIG. 3B and FIG. 3C, and FIG. 3C and FIG. 3D.

The segment jackets 30a to 30g each have a lower end fixed to the positioner body 21 and are simply mounted on the assembled body 10. Therefore, even the mount table 22 is rotated, the segment jackets 30a to 30g are kept fixed, and only the assembled body 10 (the mount table 22) is rotated. Therefore, to an open region between the segment jacket 30a and the segment jacket 30g, the discharge port $14_{OUT}$ of a portion that is not yet a target for welding comes. In this manner, by forming a new open region OP (discharge port $14_{OUT}$), the next welding is performed. Then, the procedure described above is repeated until the assembled body 10 rotates 360 degrees.

In the present embodiment described above, welding is performed with most of the assembled body 10 being covered with the segment jackets 30a to 30g. Therefore, according to the present embodiment, heat radiation from the assembled body 10 during welding can be inhibited. Therefore, a decrease in temperature of the assembled body 10 during welding can be prevented. Also, since radiant heat received by the worker is also reduced, the worker is not required to wear a heavy heat insulation equipment. In particular, in the present embodiment, to move the segment jackets 30a to 30g with respect to the assembled body 10, all the worker has to do is to simply move the mount table 22 of the positioner 22. Therefore, the work load on the worker is extremely light.

Figure 6:
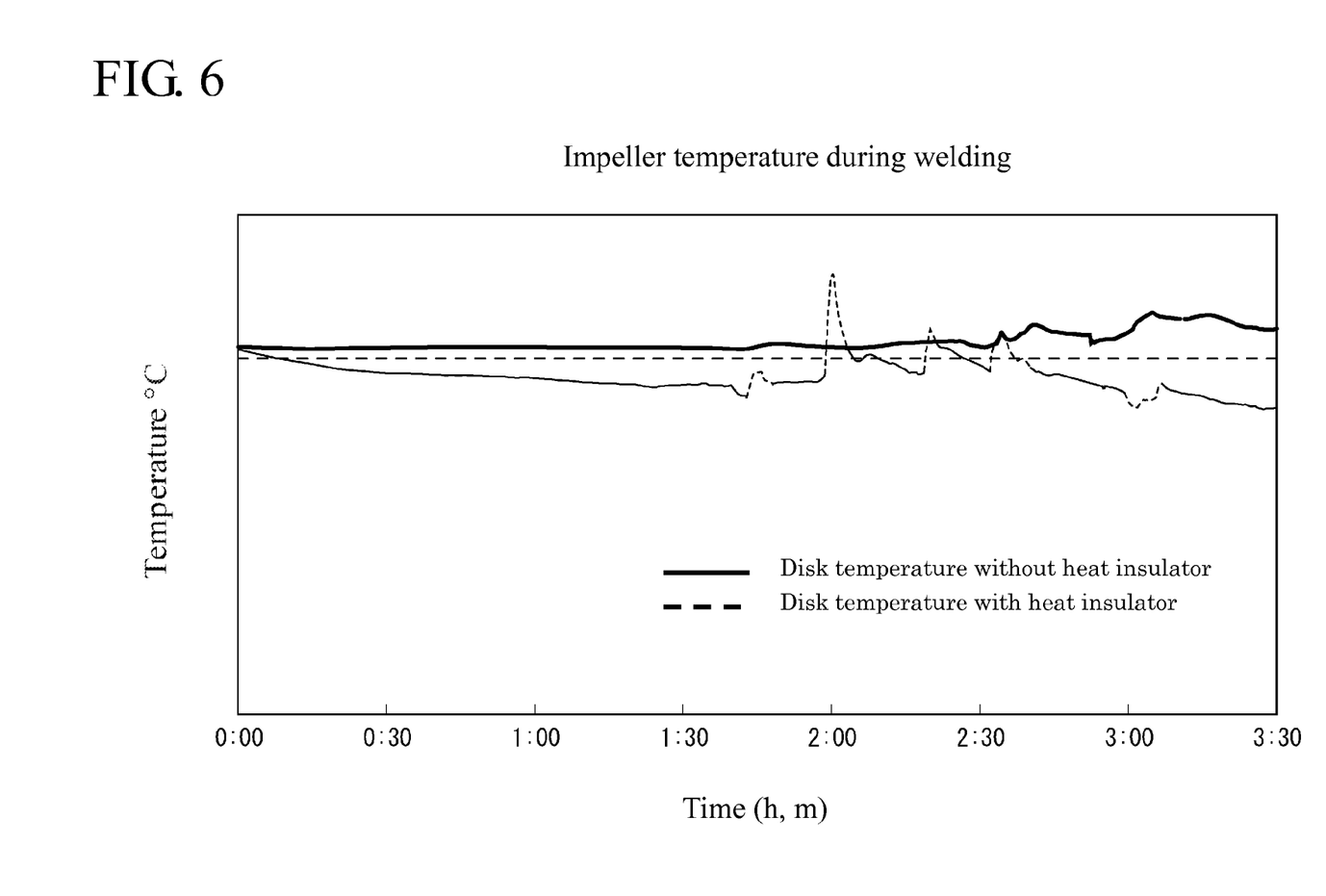
FIG. 6 is a graph showing temperature measurement results during welding of the impeller.

FIG. 6 shows results obtained by measuring temperatures during welding in the case of welding by using the segment jackets 30a to 30g (disk temperature with a heat insulator) and in the case of welding without using the segment jackets 30a to 30g (disk temperature without a heat insulator). As shown in FIG. 6, by welding by using the segment jackets 30a to 30g, the temperature during welding can be kept at a predetermined temperature indicated by a broken line or higher.

Figure 4:
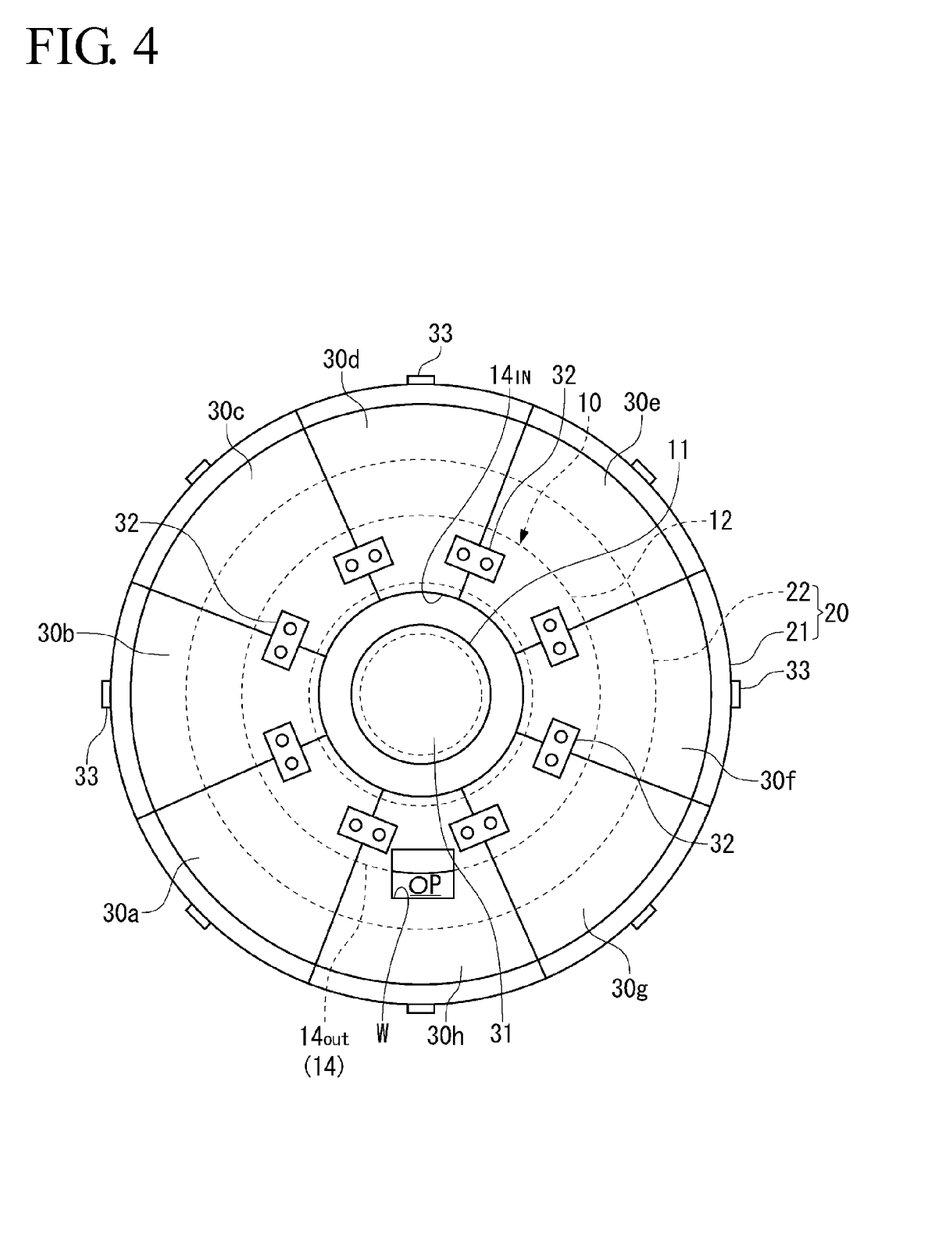
FIG. 4 is a plan view of the impeller covered with the heat insulating jacket having a window for welding formed thereon in the present embodiment.

While one of the segment jackets (30a to 30g) is not placed to form the open region OP in the present embodiment described above, the present invention is not limited to this embodiment. For example, as shown in FIG. 4, the open region OP can be formed by providing a window W penetrating through front and rear surfaces to a segment jacket 30h.

Also, adjacent ones of the segment jackets 30a to 30g are connected with the connector 32, thereby increasing stiffness as a whole. Therefore, it is possible to prevent the segment jackets 30a to 30g from mutually causing a positional misalignment and curling up in accordance with the rotation of the assembled body 10.

In the present embodiment, the material configuring the heat insulating jacket is not restrictive, and any of various known materials can be used. For example, a fireproof sheet made of fireproof fiber such as ceramic fiber or glass fiber can be used for the heat insulating jacket.

Also, while the example of the segment jackets obtained by division in a circumferential direction has been described in the present embodiment, the present invention is not limited to this, and segment jackets obtained by division in a diameter direction can also be used. As a matter of course, an integral jacket covering the assembled body 10 except the open region OP and the inflow port $14_{IN}$ can be used in the present invention.

Furthermore, while the positioner 20 is used to rotate and move the heat insulating jacket (the segment jackets 30a to 30g) with respect to the assembled body 10 in the present embodiment, the present invention is not limited to this, and the open region OP can be moved by the worker moving the heat insulating jacket with a manual operation.

Still further, though the example of the impeller 10 described in the present embodiment is of the two-piece type in which the blades 13 are formed integrally with the hub 11 or the shroud 12, the present invention is not limited to this. For example, the present invention can be similarly applied to the impeller 10 of the three-piece type in which the hub 11, the shroud 12, and the blades 13 are individually produced and joined together.

For joining for the impeller 10 of the three-piece type, the welding in the present embodiment can be applied in two stages as described below.

As a first stage, when the hub 11, the shroud 12, and the blades 13 are individually produced and joined together, welding can be performed in a manner similarly to that of the present embodiment with the blades 13 and the hub 11 and the blades 13 and the shroud 12, which are to be welded, being covered with the heat insulating jacket, except the open region OP required for welding. Specifically, when the blades 13 and the hub 11 are joined by welding, the blades 13 and the hub 11 with their positions fixed in advance by preliminary welding are mounted so that the hub 11 faces the mount table 22 (the mount surface) of the positioner 20, and welding can be performed with the blades 13 and the hub 11 being covered with the heat insulating jacket. The same applies to the case in which the blades 13 and the shroud 12 are joined by welding, and welding can be performed with the blades 13 and the shroud 12 being covered with the heat insulating jacket.

As a second stage, welding can be performed similarly to the present embodiment with the assembled body 10 in which the hub 11 and the shroud 12 subjected to the first stage described above are placed on top of each other via the blades 13 is covered with the heat insulating jacket except the open region OP and the inflow port $14_{IN}$ required for welding.

Other than the above, the structures cited in the embodiment described above can be selected, omitted, or changed to another structure as appropriate as long as such selection, omission, change, or combination does not deviate from the gist of the present invention.

REFERENCE SIGNS LIST 10 impeller (assembled body)
11 hub
12 shroud
13 blade
14 flow path
$14_{IN}$ inflow port
$14_{OUT}$ discharge port
20 positioner
21 positioner body
22 mount table
30, 31 heat insulating jacket
30a to 30h segment jacket
32 connector
33 fastener
W window

The invention claimed is:

1. An impeller manufacturing method in which an impeller includes a hub, a shroud placed to face the hub, and a plurality of blades provided between the hub and the shroud, the impeller having a flow path leading from an inflow port to a discharge port formed between the hub and the shroud with a fluid flowing from the inflow port toward the discharge port, the hub and the shroud joined by welding, wherein:
    during the welding, an assembled body with the hub and the shroud placed on top of each other is in an upright state in which the inflow port is oriented upward and the hub is placed to face a mount surface;
    welding is performed on the assembled body with a heat insulating jacket covering the assembled body except an open region and the inflow port that are required for welding; and
    when welding of the open region is completed, the heat insulating jacket is moved with respect to the assembled body to form a new open region for next welding.

2. The impeller manufacturing method according to claim 1, wherein
    the heat insulating jacket is formed of a plurality of divisional segment jackets.

3. The impeller manufacturing method according to claim 1, wherein
    a window penetrating through both of front and rear surfaces is provided to the heat insulating jacket at a position that is supposed to correspond to the open region.

4. The impeller manufacturing method according to claim 2, wherein
    a window penetrating through both of front and rear surfaces is provided to the heat insulating jacket at a position that is supposed to correspond to the open region.

5. The impeller manufacturing method according to claim 1, wherein
    a positioner is used, the positioner including a positioner body and a mount table rotatably placed relative to the positioner body,
    the assembled body is mounted on the mount table and the welding is performed with the assembled body being covered with the heat insulating jacket fixed to the positioner body, and
    after the welding for the open region is completed, the mount table is rotated to relatively move the assembled body and the heat insulating jacket to form the new open region.

6. The impeller manufacturing method according to claim 2, wherein
    a positioner is used, the positioner including a positioner body and a mount table rotatably placed relative to the positioner body,
    the assembled body is mounted on the mount table and the welding is performed with the assembled body being covered with the heat insulating jacket fixed to the positioner body, and
    after the welding for the open region is completed, the mount table is rotated to relatively move the assembled body and the heat insulating jacket to form the new open region.

7. The impeller manufacturing method according to claim 3, wherein
    a positioner is used, the positioner including a positioner body and a mount table rotatably placed relative to the positioner body,
    the assembled body is mounted on the mount table and the welding is performed with the assembled body being covered with the heat insulating jacket fixed to the positioner body, and
    after the welding for the open region is completed, the mount table is rotated to relatively move the assembled body and the heat insulating jacket to form the new open region.

8. The impeller manufacturing method according to claim 2, wherein
    when the heat insulating jacket covering the assembled body is the segment jackets,
    adjacent ones of the segment jackets are connected with a connecting member.

9. The impeller manufacturing method according to claim 4, wherein
    when the heat insulating jacket covering the assembled body is the segment jackets,
    adjacent ones of the segment jackets are connected with a connecting member.

* * * * *